(12) United States Patent
Caroli et al.

(10) Patent No.: US 10,750,836 B2
(45) Date of Patent: Aug. 25, 2020

(54) BAG FOR USE WITH A MOBILE PHONE

(71) Applicant: GIANOI LIMITED, London (GB)

(72) Inventors: Enrico Caroli, London (GB); Raffaele Caroli, London (GB)

(*) Notice: Subject to any disclaimer, the term of this patent is extended or adjusted under 35 U.S.C. 154(b) by 0 days.

(21) Appl. No.: 15/573,464

(22) PCT Filed: May 13, 2016

(86) PCT No.: PCT/GB2016/051390
§ 371 (c)(1),
(2) Date: Nov. 11, 2017

(87) PCT Pub. No.: WO2016/181165
PCT Pub. Date: Nov. 17, 2016

(65) Prior Publication Data
US 2018/0116360 A1 May 3, 2018

(30) Foreign Application Priority Data
May 13, 2015 (GB) .................................. 1508126.8

(51) Int. Cl.
*A45C 15/06* (2006.01)
*A45C 3/06* (2006.01)
*A45C 3/00* (2006.01)
*H05B 47/19* (2020.01)
(Continued)

(52) U.S. Cl.
CPC ............... *A45C 15/06* (2013.01); *A45C 3/00* (2013.01); *A45C 3/06* (2013.01); *A45C 13/02* (2013.01);
(Continued)

(58) Field of Classification Search
CPC ..................................................... A45C 15/06
(Continued)

(56) References Cited

U.S. PATENT DOCUMENTS 8,774,776 B1 * 7/2014 Ornstein ............... H04M 19/04
455/414.1
9,521,236 B2 * 12/2016 Del Toro ............ H04M 1/7253
(Continued)

FOREIGN PATENT DOCUMENTS

AU 2010201820 A1 11/2011

OTHER PUBLICATIONS

International Search Report completed Aug. 4, 2016, 4 pages.

*Primary Examiner* — Edward Tso
*Assistant Examiner* — Ahmed H Omar
(74) *Attorney, Agent, or Firm* — Landmark Intellectual Property Law, PC; Gregory M Murphy

(57) ABSTRACT

There is provided a bag (10) comprising an outer shell (15), the outer shell having an exterior surface (14) and an inferior surface (16) opposite the exterior surface. The interior surface (16) faces towards an interior (18) of the bag, the interior for storing a mobile phone (100). The bag (10) comprises a plate (40) mounted on the exterior surface, a lamp, and a controller, wherein the plate comprises a lens or aperture (42) for viewing the lamp therethrough, and wherein the lamp is electrically connected to the controller, the controller comprising a wireless transceiver for wirelessly communicating with the mobile phone (100). The plate (40) and the controller form a touch detector configured to detect when the plate is touched, the bag comprises a battery pack (30) within the interior of the bag, and the battery pack (30) is connected to the controller for powering the controller.

20 Claims, 3 Drawing Sheets

(51) Int. Cl.
*A45C 13/02* (2006.01)
*H02J 7/00* (2006.01)
*H02J 7/02* (2016.01)
*H04B 1/3883* (2015.01)
*H04M 1/02* (2006.01)
*A45C 11/00* (2006.01)
*H02J 7/35* (2006.01)

(52) U.S. Cl.
CPC ............ *H02J 7/0047* (2013.01); *H02J 7/025* (2013.01); *H04B 1/3883* (2013.01); *H04M 1/0202* (2013.01); *H05B 47/19* (2020.01); *A45C 2011/002* (2013.01); *A45C 2013/025* (2013.01); *H02J 7/35* (2013.01)

(58) Field of Classification Search
USPC ........................................................ 320/114
See application file for complete search history.

(56) References Cited

U.S. PATENT DOCUMENTS

| | | | |
|---|---|---|---|
| 2004/0090773 A1 | 5/2004 | Bryan | |
| 2012/0042996 A1* | 2/2012 | Glynn | A45C 15/00 150/106 |
| 2013/0214931 A1 | 8/2013 | Chia | |
| 2014/0000771 A1* | 1/2014 | Sherman | A45C 3/06 150/106 |
| 2014/0285347 A1* | 9/2014 | Kearns | A45C 13/02 340/644 |
| 2015/0101958 A1* | 4/2015 | Cross | A45C 5/14 206/702 |
| 2015/0270728 A1* | 9/2015 | Williams | H02J 7/0044 320/111 |
| 2017/0049205 A1* | 2/2017 | Tekin | A45C 15/06 |

\* cited by examiner

BAG FOR USE WITH A MOBILE PHONE

RELATE APPLICATIONS

The present application is a U.S. National Phase filing of PCT Application No. PCT/GB2016/051390, filed on 13 May 2016, which claims priority to Great Britain Patent Application No. 1507126.8, filed on 13 May 2015, each of which is incorporated herein by reference in its entirety.

BACKGROUND

The present invention relates to a bag for use with a mobile phone, for example to aid in carrying the mobile phone.

It is common for people to carry mobile phones in bags such as handbags, and so there is a desire to help facilitate the use of mobile phones whilst stored in bags such as handbags.

For example, a known handbag includes a battery which is stored inside the handbag, and which has a charging plug that can be plugged into a mobile phone inside the handbag, to charge the mobile phone. The battery can be recharged by placing the handbag on a charging station, which supplies electrical power to the battery. However, the conduction of charge from the charging station to the battery requires metal-to-metal contact between the charging station and the battery, which could be disrupted by contact surfaces becoming soiled over time.

Mobile phones typically emit audible notifications to indicate various events to the owner of the phone, and these notifications may be heard outside of whichever bag the mobile phone is being carried within. However, there are situations in which such notifications may be missed, for example if the mobile phone has been set to silent mode, or if the audible notification is overwhelmed by other noise in the close vicinity, or if the person to too tar away from the bag at any given moment.

It is therefore an object of the invention to further facilitate the use of mobile phones, for example whilst being stored in bags such as handbags.

SUMMARY OF THE INVENTION

According to some aspects of the invention, there is provided a bag comprising an outer shell, the outer shell having an exterior surface and an interior surface opposite the exterior surface. The interior surface faces towards an interior of the bag, the interior for storing a mobile phone. The bag comprises a plate mounted on the exterior surface of the bag, a lamp, and a controller, wherein the plate comprises a lens or aperture for viewing the lamp therethrough, and wherein the lamp is electrically connected to the controller. The controller comprises a wireless transceiver for wirelessly communicating with the mobile phone. The plate and the controller form a touch detector configured to detect when the plate is touched, the bag comprises a battery pack within the interior of the bag, and the battery pack is connected to the controller for powering the controller.

Therefore, the mobile phone can wirelessly connect to the controller whilst the phone is in the bag, and the controller can control the lamp to notify the owner of the phone when there has been some activity on the mobile phone. The use of a plate on the exterior of the bag provides a visual element which the owner of the phone can easily focus upon to check whether the lamp indicates there has been any activity on the mobile phone. Additionally, the bag may be formed from a soft and flexible material, and the plate may provide rigidity to help anchor the lamp in place on the bag. The bag may be a handbag, for example a tote bag.

The outer shell of the bag may be a flexible fabric material, for example formed of woven or non-woven fibres, or natural or synthetic leather. The outer shell preferably has height, width, and length dimensions of greater than 0.1 m×0.05 m×0.15 m, so that it is large enough to hold the phone along with a few other items, and less than 0.6 m×0.4 m×0.6 m, so that it can be used as a personal carry bag.

The plate may be formed from variety of materials, for example metal, plastic, glass, or potentially even a tough fabric or leather. The plate preferably extends over an area of no greater than 0.15 m×0.15 m, more preferably no greater than 0.1 m×0.1 m, even more preferably no greater than 0.05 m×0.05 m.

Preferably, the plate is formed of a rigid material to help maintain the shape of the plate around the lamp, for example a material that is more rigid than a material forming the outer shell around the plate. Allowing the plate to extend over too large an area could result in the bag becoming unnecessarily rigid.

Advantageously, the plate may be a badge designating a brand of the bag. Since many bags already include a plate designating the brand of the bag, the use of this plate to display the lamp, avoids any need to manufacture and fit an extra plate to the bag for displaying the lamp.

The lamp comprises at least one light source for lighting the lamp. Preferably, the lamp is configured to light up in at least two different colours, for example by including two light sources of different colours, or by modulating the colour of a single light source. The colour in which the lamp is lit may be set according to a colour signal received from the controller. Each light source may be a light emitting diode (LED).

The bag may also comprise a speaker connected to the controller, the speaker being open to the outside of the bag, for reproducing audio notifications of the phone. The bag may also comprise a vibrator connected to the controller, wherein the vibrator is mounted in the handle of the bag, the vibrator being activated by the controller when an event occurs one the mobile phone.

One of the problems with storing mobile phones in bags, is that the owner of the phone may think they have placed the phone inside of the bag when leaving a location, when in reality they have not, and the phone has been left behind. Advantageously, the controller may be configured to light the lamp in an alert colour in response to a wireless connection between the controller and the mobile phone becoming broken, or being unexpectedly terminated. Then, if the owner forgets to put the mobile phone inside the bag once they have finished using the phone, and subsequently leaves that location resulting in the wireless connection between the controller and the mobile phone becoming broken, then the lamp alerts the owner that the mobile phone is no longer near the bag, and may have been left behind. The alert colour is preferably a Red colour, and could be flashed on and off to help draw the attention of the owner to it.

The plate may be mounted to the controller by a fixing element passing through the outer shell, so that the controller and plate can both be easily mounted to the outer shell. The lamp may be housed within the controller, rather than within the plate, and light from the lamp may pass through an aperture in the outer shell, and then out of the plate via one or more lenses or apertures in the plate. Optionally, the speaker may also be housed by the controller, so that both light and sound can exit via the aperture in the plate.

Since the plate and the controller form a touch detector configured to detect when the plate is touched, the owner of the phone can interact with the controller and optionally even with the mobile phone via the controller, by touching the plate. The controller may be configured to take different types of action for different types of touches, for example touching the plate briefly may cause the last notification to be dismissed by turning off the lamp, and touching the plate for a longer period of time may cause the lamp to take a colour corresponding to an amount of charge still remaining in a battery of the controller, or in a battery of the mobile phone.

The detection of touches by the plate and controller may be achieved in a variety of different ways, although one advantageous configuration when the controller and the plate are rigidly fixed relative to one another is to provide an accelerometer in the controller. This is particularly elective when the outer shell is formed of a flexible fabric, since the flexible fabric will deform when the plate is touched, resulting in movement of the controller.

Alternatively, the controller may be electrically connected to an electrode of the plate, so that the controller can measure capacitance of the plate to determine when the plate has been touched.

The battery pack may be connected to a charging plug for charging the mobile phone. Accordingly, the battery pack may be used to both power the controller, and to recharge the mobile phone.

Advantageously, the controller may comprise a processor configured to control the lamp to display a charge status of the battery pack, in response to the touch detector detecting that the plate has been touched.

The battery pack may be positioned adjacent the interior surface of the outer shell, so that wireless charging of the battery pack can take place through the outer shell of the bag, using a wireless charger external to the bag. An area of the outer shell may be uninterrupted by any holes or fixing elements, the area extending to all of the outer shell that is adjacent to the battery pack, thereby simplifying manufacturing of the outer shell and preventing ingress of any dirt/moisture into the battery pack.

The wireless charger may be an inductive charger, although other types of wireless charging such as ultrasonic charging could alternatively be used. For the avoidance of any doubt, a wireless charger is a charger which transfers energy to a battery wirelessly, to charge the battery.

Also, since there are no holes or fixing elements, the position of the battery may not be visible from outside of the bag. Accordingly, the battery pack may comprise one or more magnets to allow its location to be detected from outside of the bag. For example, the magnets may be placed around an inductive charging element inside the battery pack, so that the inductive charger can be aligned with the inductive charging element.

The bag may comprise a bottom layer defining a bottom of the bag, and the battery pack may be located between the bottom layer and the outer shell at the base of the bag. Therefore, the weight of the battery pack adds stability to the bag to help the bag stand upright when the bag is not being held. Furthermore, the bottom layer partitions the battery pack away from any items that an owner of the bag places within the bag, to prevent them from interfering with the battery pack. Advantageously, the battery pack may be encased within a sponge material which prevents any significant movement of the battery pack within the bag.

There is further provided a system comprising the bag described above, and a wireless charger for charging the battery pack from outside of the bag. And, a system comprising the bag described above and the mobile phone, wherein the mobile phone is configured to wirelessly connect to the wireless transceiver of the controller, and command the controller to light the lamp via the wireless connection. For the avoidance of any doubt, a mobile phone is considered to be a hand-held device which can be used to make telephone calls to other people via one or more networks.

DESCRIPTION OF THE FIGURES

The accompanying drawings, which are incorporated in and constitute apart of this disclosure, illustrate exemplary embodiments and, together with the description, serve to explain the disclosed principles. Some embodiments of systems and/or methods in accordance with embodiments of the present subject matter are now described, by way of example only, and with reference to the accompanying figures. Embodiments of the invention will now be described by way of non-limiting example only and with reference to the accompanying drawings, in which.

The figures are not to scale, and same or similar reference signs denote same or similar features.

DETAILED DESCRIPTION

Figure 1:
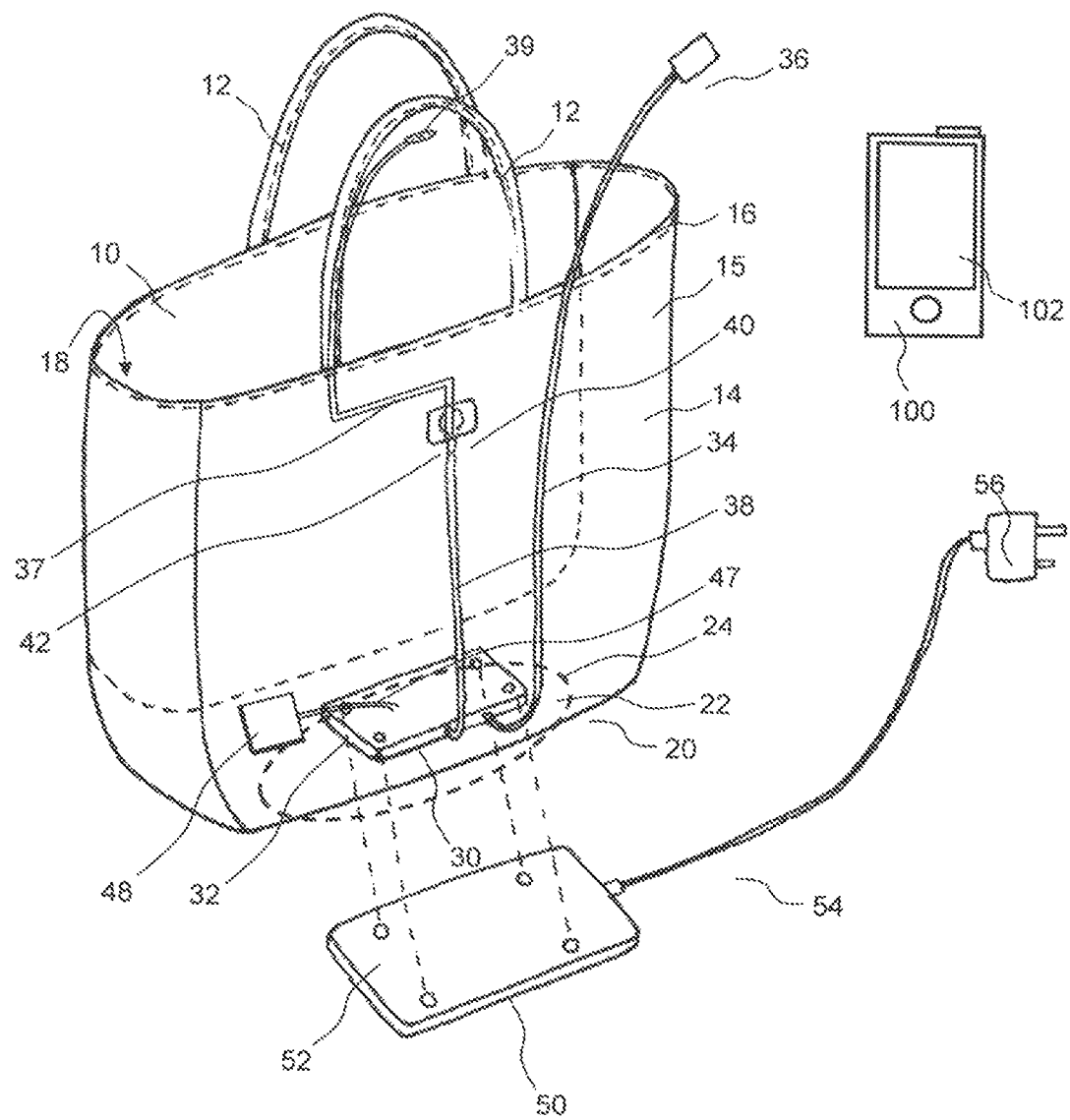
FIG. 1 shows a schematic perspective diagram of a system comprising a bag according to an embodiment of the invention.
Figure 2:
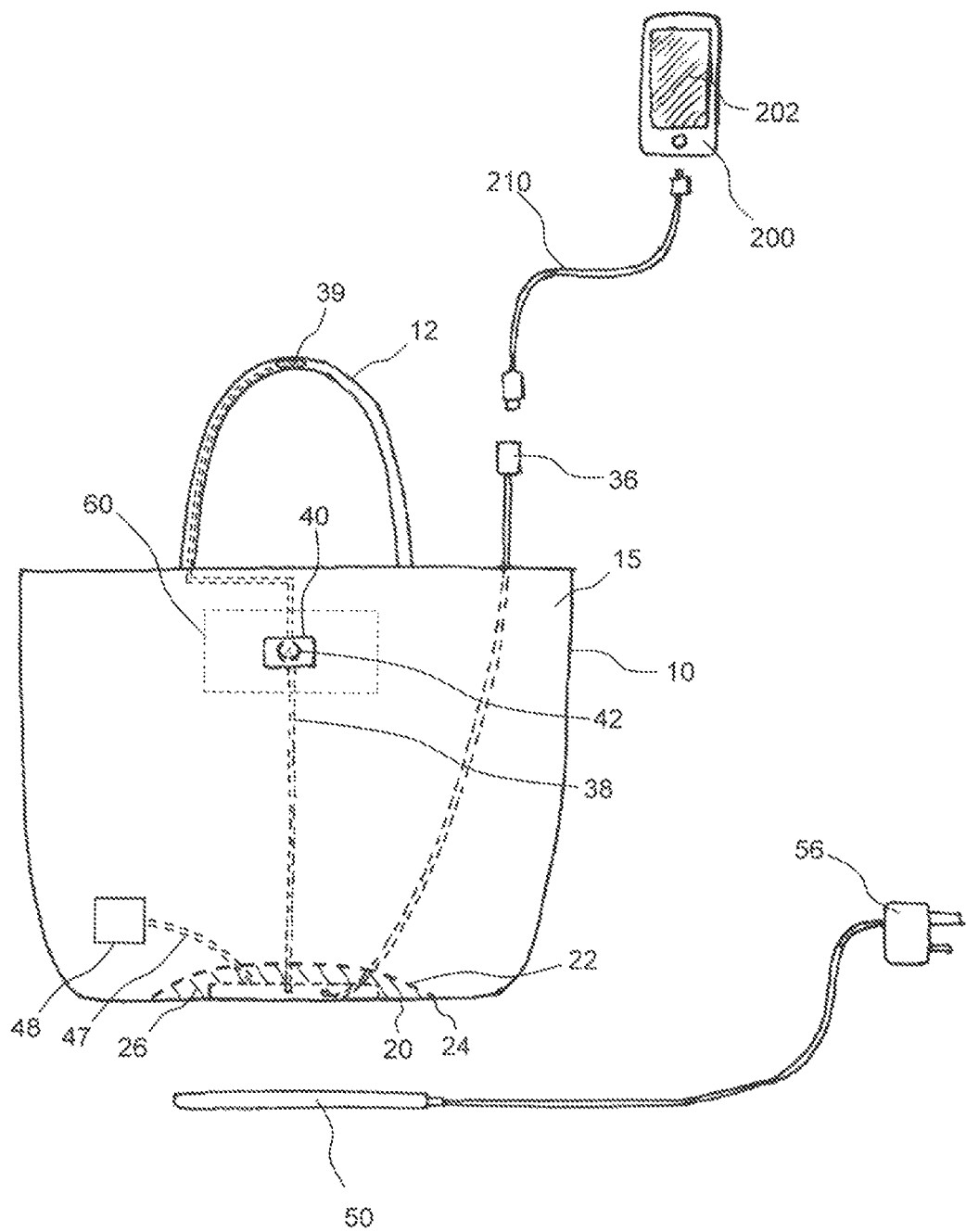
FIG. 2 shows a side view of the system of FIG. 1.

An embodiment of the invention will now be described with reference to FIGS. 1-3. Firstly referring to FIG. 1, there is provided a system comprising a bag 10, an inductive charger 50, and a mobile phone 100. The bag 10 has a leather outer shell 15, and the outer shell 15 defines an exterior surface 14 on an outside of the outer shell, and an interior surface 16 on an inside surface of the outer shell. The exterior and interior surfaces 14 and 16 are opposite one another on opposing sides of the outer shell 15. The interior surface 16 defines an interior 18 of the bag, which may be used for storing items inside of the bag.

The bag 10 is a tote bag in this embodiment, and includes two handles 12 for carrying the bag by hand. The bag 10 also includes a battery pack 30, which is at the base 20 of the bag, between the interior surface 16 and a bottom layer 22 which defines the bottom of the interior of the bag. As best seen in the side view of FIG. 2, the bottom layer 22 extends over the battery pack 30, and is attached to the base 20 of the outer shell 15 at interface 24.

The battery pack 30 is encapsulated in sponge 26, which holds the battery pack in position between the base 20 and the bottom layer 22. The sponge 26 is formed of a foam material. Returning to FIG. 1, the interface 24 extends around the battery pack 30 at the interface between the base 20 and the bottom layer 22, and the bottom layer 22 preferably has an invisible zip (not shown in Figs) for providing access to the battery pack 30 in case it needs to be replaced.

The battery pack 30 comprises battery cells, and an electrical generator in the form of an inductive charging element. The inductive charging element harnesses electromagnetic energy from an inductive charger 50, to charge the battery cells, as will be apparent to those skilled in the art. Since the battery pack is fully contained inside of the bag 10, by the base 20 of the outer shell, there is no visible trace of the battery pack 30 when the base 20 of the bag is viewed from outside of the bag 10. The inductive charger 50 is connected to a cable 54 and mains plug 56, the mains plug 56 for plugging into a mains power supply to power the inductive charger 50.

To help locate the inductive charger 50 with respect to the inductive charging element of the battery pack 30, the battery pack further comprises four magnets 32 which are configured to attract four corresponding magnets 52 of the inductive charger 50. Therefore, the bag can easily be positioned in the correct location over the inductive charger 50 for inductive charging to take place, even though the battery pack 30 cannot be seen from outside of the bag. In this embodiment, the four magnets are positioned at four corners of the battery pack in a rectangular configuration, although other numbers of magnets and other magnet configurations could be implemented in alternate embodiments.

The bag 10 also includes an electrical generator 48, which generates electrical power to charge the battery pack 30 via a cable 47. In this embodiment, the generator 48 is a photovoltaic panel exposed at the exterior of the bag for gathering solar energy and charging the battery pack 30 via a cable 47. In an alternate embodiment, the generator 48 is a kinetic converter for converting kinetic energy from motion of the bag to electrical energy for charging the battery pack 30 via the cable 47. Or, the generator 48 is an electromagnetic converter for harvesting ambient electromagnetic wave energy such as radio waves and converting the radio waves to electrical energy for charging the battery pack 30 via the cable 47. Or, the generator 48 is a thermal converter or a sonic converter for harvesting thermal energy or sound energy.

Optionally, the generator 48 could be implemented as part of the battery pack, rather than as a separate component. In the illustrated embodiment the generator 48 is an addition to the inductive charging element generator of the battery pack, although in alternate embodiments one or both of the generator 48 and the inductive charging element generator may be omitted.

The battery pack 30 has two outputs for electrical power, one connected to a first cable 34 and the other connected to a second cable 38. The first cable 34 is terminated to a charging plug 36 for charging a mobile phone 100. Therefore, the mobile phone 100 can be placed in the bag 10 and the charging plug 36 can be plugged into the mobile phone to charge a battery of the mobile phone from the battery pack 30. The mobile phone 100 has a touchscreen display 102. Referring to FIG. 2, an adaptor cable 210 may be used to connect to a mobile phone 200 which is incompatible with the charging plug 36. The mobile phone 200 also has a touchscreen display 202. Optionally, the charging plug 36 may be pluggable into an external charging device for charging the battery pack 30.

The second cable 38 leads up towards a metal plate 40. The metal plate 40 is mounted on the leather outer shell 15, and has two apertures 42 for transmission of light from a lamp. Optionally, the two apertures 42 may be filled with two respective lenses for transmitting the light from the lamp.

A third cable 37 leads from the region of the metal plate 40, up to a vibrator 39 which is mounted in one of the handles 12.

A portion 60 of the bag is designated in FIG. 2, and the plate 40 will now be described in more detail with reference to FIG. 3, which shows an exploded diagram of the portion 60 of the bag.

Figure 3:
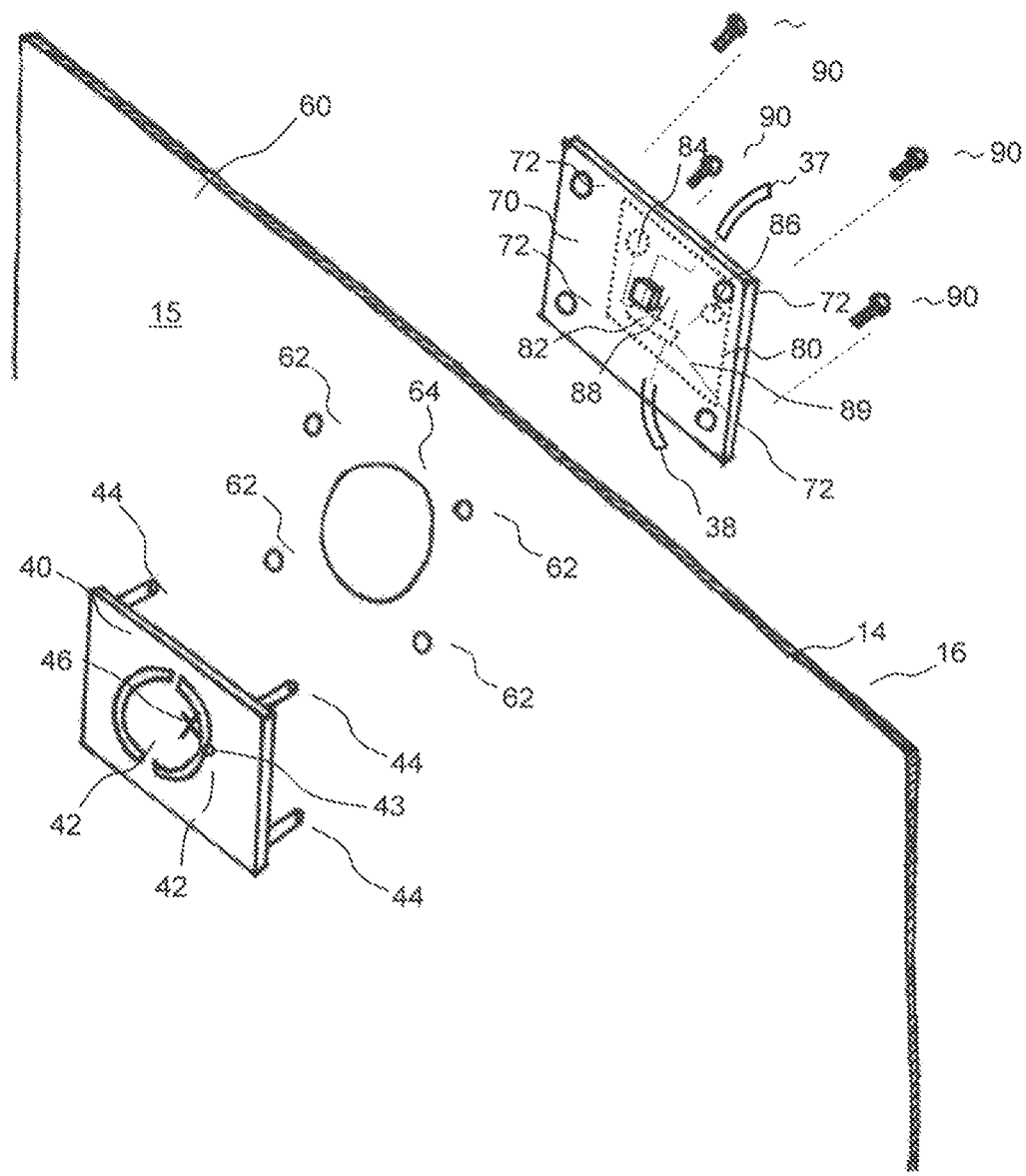
FIG. 3 shows an exploded perspective diagram of a portion of the bag of FIGS. 1 and 2.

FIG. 3 shows the outer shell 15 having the exterior surface 14 and interior surface 16. The outer shell has five holes through the outer shell four smaller holes 62, and one relatively larger hole 64. The metal plate 40 has the two apertures 42, and a brand "X" 46 marked in the centre of the metal plate. Accordingly, the metal plate 40 is a badge designating the brand "X" of the bag. The metal plate 40 also has a light sensor 43, for sensing whether the metal plate is exposed to ambient light, or whether ambient light being blocked by a finger covering over the light sensor, indicating that the plate is being touched. The apertures 42, the light sensor 43, and the brand 46 of the bag may be arranged differently to that shown in FIG. 3 in alternate embodiments.

The metal plate 40 has metal posts 44 connected to it, which protrude perpendicularly outward from the metal plate 40. The metal posts 44 are configured to pass through the holes 62 of the outer shell 15, and into holes 72 of a housing of a controller 70. The controller 70 comprises screws 90 which are screwed into the metal posts 44, thereby sandwiching the outer shell 15 between the metal plate 40 and the housing of the controller 70. Therefore, in this particular embodiment the controller 70 is mounted on the interior surface 16 of the outer shell, at a same point along the outer shell as where the plate 40 is mounted on the exterior surface of the outer shell.

The controller 70 comprises a printed circuit board (PCB) 80 which is held within the controller housing. The PCB 80 has a processor 82, and the processor 82 is connected to a wireless transceiver 84, an accelerometer 86, a lamp 88, and the light sensor 43. The lamp 88 is visible through a window of the controller housing, and constitutes a lamp which can emit light through the hole 64 in the outer shell, and out of the metal plate 40 via the apertures 42.

The PCB 80 is powered by the battery pack 30 via the second cable 38, the second cable 38 being connected to the housing of the controller 70. The third cable 37, which leads up to the vibrator 39 in the handle 12, is also connected to the housing of the controller 70, and to the processor 82. The processor 82 thereby controls via the third cable 37 when the vibrator 39 should vibrate.

The wireless transceiver 84 is a Bluetooth® transceiver for wirelessly connecting to the mobile phones 100 or 200 via Bluetooth®. The connection may be established whenever the mobile phones 100 or 200 move within wireless range of the wireless transceiver 84, as will be apparent to those skilled in the art. Clearly, other types of wireless communication protocol other than Bluetooth® could be used in alternate embodiments. For example, sonic communications may be used to establish the wireless connection, such as ultrasound, infrasound, or even sounds inside the range of human hearing, between 20 Hz and 20 KHz.

The accelerometer 86 is configured to sense acceleration, which may be the result of an owner of the bag tapping the metal plate 40. Since the metal plate 40 is rigidly secured to the controller 70 by the posts 44 and screws 90, and the outer shell 15 is formed of flexible leather, taps on the metal plate 40 are effectively transmitted to the accelerometer 86 of the controller 70.

The processor 82 is electrically connected to one of the holes 72 through the controller housing by a wire 89. The metal post 44 electrically connects to the one of the holes when it is inserted in the hole, and so the metal plate 40 is electrically connected to the processor. The processor is configured to sense a capacitance of the metal plate 40, and can therefore determine when a person touches the metal plate 40, as will be apparent to those skilled in the art. Since the plate 40 is metal, it provides an electrode by which the capacitive sensing can be accomplished. In an alternate embodiment, the exterior surface of the plate may be formed of an insulative material, and an electrode for capacitive sensing may be positioned beneath the insulative material.

The mobile phone 100 or 200 comprises software which sends notifications to the wireless transceiver 84 via the wireless connection. The notifications alert the controller 70 of various events occurring at the mobile phone. Such events may include, for example, a low battery power notification, a missed call notification, a text message notification, or an email notification. Preferably, the mobile phone software allows selection of which events should be notified to the controller 70.

The processor 82 receives a notification from the mobile phone 100 or 200, via the wireless transceiver 84, and based on the type of notification, sends a colour signal to the lamp making the lamp light up in a particular colour. The processor 82 also instructs the vibrator 39 in the handle 12 to vibrate upon receipt of the notification, via the third cable 37.

In this embodiment, the lamp is formed by Red, Green, and Blue light emitting diodes (LED), and the colour signal instructs which of these LED's should be lit and at what intensities, to define the overall colour of the lamp 88. Preferably, each type of notification corresponds to a respective lamp colour. If more than two notifications are received, then the processor 82 may instruct the lamp 88 to repeatedly cycle through the colours corresponding to the received notifications. The mobile phone software allows specification of which colours should be displayed for which events, and so the notifications sent from the mobile phone to the wireless transceiver 84 simply specify a colour in which the lamp 88 is to be lit.

In an extended embodiment, the PCB 80 additionally comprises a speaker device adjacent to the lamp 88, and the processor 82 instructs the speaker device to emits an alert tone whenever a new notification is received.

Once the owner of the bag has been alerted to the notification by the lamp 88 and/or the vibrator 39, and optionally the speaker device, the owner may tap the metal plate 40 to dismiss the notification and return the lamp to its unlit state. Specifically, the tap is detected by the accelerometer 86, and the controller controls the lamp to turn off. The tap may also be detected by capacitive sensing via the wire 89, or via the light sensor 43, to help ensure the tap is not missed. Or, the controller may be configured to respond to the owner touching the metal plate 40 for greater than a predetermined time, in which case the capacitive sensing or the light sensor 43 may be more effective than relying on the accelerometer 86. In this embodiment, the accelerometer, the light sensor, and the capacitive sensing are all implemented, although in an alternate embodiment only one of these sensing methods may be implemented. If the accelerometer 86 was not implemented, then the controller 70 could be located adjacent the battery pack 30, for example between the bottom layer 22 and the base 20 of the outer shell. Or, the controller could be distributed in separate parts, for example one part at the plate for touch sensing and another part at the battery pack for wirelessly connecting to the mobile phone.

The processor 82 is configured so that, if the metal plate 40 is tapped three times in quick succession, the lamp 88 displays a colour corresponding to a level of charge of the battery pack 30. Then, the owner of the bag can monitor the level of the charge and determine when re-charging is needed by the inductive charger 50.

If the wireless connection between the mobile phone and the wireless transceiver 84 is unexpectedly terminated, then the processor 82 instructs the lamp 88 to flash on and off in a red colour, to alert the owner of the bag. Therefore, if the owner of the bag forgets to return their mobile phone to the bag after use, and then walks off with their bag, then the wireless connection between the wireless transceiver 84 and the mobile phone will be unexpectedly terminated when the wireless transceiver 84 moves out of wireless range of the phone, and the lamp will flash red to alert the owner of the bag that they have left their mobile phone behind.

In an alternate embodiment, the lamp 88 is mounted on the metal plate 40 and connected to the processor 82 via a cable that passes through the outer shell 15, rather than being directly mounted on the PCB 80.

Many other variations of the described embodiments falling within the scope of the appended claims will also be apparent to those skilled in the art.

What is claimed is:

1. A bag comprising an outer shell formed from a soft and flexible material, the outer shell having an exterior surface and an interior surface opposite the exterior surface, the interior surface facing towards an interior of the bag, the interior for storing a mobile phone, the bag comprising:
   a plate, formed from a rigid material and mounted on the exterior surface of the bag to anchor a lamp in place on the bag, the plate comprising:
   a lens or aperture for viewing a lamp therethrough;
   one or more posts that protrude substantially perpendicularly from the plate through holes in the outer shell;
   the plate anchoring the lamp such that light from the lamp is emitted outwardly through the lens or aperture;
   the lamp, electrically connected to the controller;
   a controller comprising a wireless transceiver for wirelessly communicating with the mobile phone;
   a battery pack within the interior of the bag, the battery pack connected to the controller for powering the controller; and
   wherein the plate and the controller form a touch detector configured to detect when the plate is touched.

2. The bag of claim 1, wherein the plate has a first surface abutting the exterior surface of the outer shell and a second surface opposite the first surface, the second surface being an external surface of the bag.

3. The bag of claim 2, wherein the second surface is a surface of metal, plastic, or glass.

4. The bag of claim 1, wherein the plate is a badge designating a brand of the bag.

5. The bag of claim 1, wherein the controller is configured to control the lamp based upon wireless signals received by the wireless transceiver of the controller.

6. The bag of claim 1, wherein the lamp comprises at least one light source for lighting the lamp, wherein the lamp is configured to light up in at least two different colours, and wherein the colour in which the lamp is lit is set according to a colour signal received from the controller.

7. The bag of claim 6, wherein the controller is configured to light the lamp in an alert colour in response to a wireless connection between the controller and the mobile phone becoming broken.

8. The bag of claim 1, wherein the controller is mounted on the interior surface of the outer shell, at a same point along the outer shell as where the plate is mounted on the exterior surface of the outer shell.

9. The bag of claim 8, wherein the plate is mounted to the controller by a fixing element passing through the outer shell.

10. The bag of claim 1, wherein:
the controller comprises an accelerometer for detecting when the plate is touched;
the controller is electrically connected to an electrode of the plate, for capacitive detection of when the plate is touched; or
the controller is electrically connected to a light sensor of the plate, for detecting when the plate is touched.

11. The bag of claim 1, wherein the controller comprises a processor, the processor configured to control the lamp in response to the touch detector detecting that the plate has been touched.

12. The bag of claim 11 wherein the processor is configured to control the lamp to display a charge status of the battery, in response to the touch detector detecting that the plate has been touched.

13. The bag of claim 1, further comprising at least one electrical generator for generating electricity to charge the battery pack.

14. The bag of claim 13, wherein the at least one electrical generator comprises:
a photovoltaic panel for generating electricity from solar energy;
a kinetic converter for generating electricity from kinetic energy;
an electromagnetic converter for generating electricity from electromagnetic waves;
a sonic converter for generating electricity from sound; or
a thermal converter for generating electricity from heat.

15. The bag of claim 13, wherein the battery pack is positioned adjacent the interior surface of the outer shell, wherein the battery pack comprises a generator of the at least one generators, and wherein that generator of the battery pack is configured for wireless charging through the outer shell by a wireless charger external to the bag, the generator of the battery pack preferably being an electromagnetic converter for generating electricity from electromagnetic waves.

16. The bag of claim 15, wherein an area of the outer shell is uninterrupted by any holes or fixing elements, the area extending to all of the outer shell that is adjacent to the battery pack.

17. The bag of claim 15, wherein the battery pack is provided with magnets to allow its location to be detected from outside of the bag.

18. The bag of claim 1, wherein the bag comprises a bottom layer defining a bottom of the bag, and wherein the battery pack is located between the bottom layer and the outer shell at the base of the bag.

19. The bag of claim 1, wherein the battery pack is encased within a sponge material which prevents any significant movement of the battery pack within the bag.

20. The bag of claim 1, further comprising a vibrator connected to the controller, wherein the vibrator is mounted in the handle of the bag.

* * * * *